United States Patent [19]

Dias et al.

[11] Patent Number: 5,161,227
[45] Date of Patent: Nov. 3, 1992

[54] MULTILEVEL LOCKING SYSTEM AND METHOD

[75] Inventors: Daniel M. Dias, Mahopac, N.Y.; Balakrishna R. Iyer, Fremont, Calif.; Philip S. Yu, Chappaqua, N.Y.

[73] Assignee: International Business Machines Corporation, Armonk, N.Y.

[21] Appl. No.: 434,649

[22] Filed: Nov. 13, 1989

[51] Int. Cl.$^5$ .................................. G06F 13/376
[52] U.S. Cl. .................................. 395/650; 395/725; 364/246.8; 364/228.1; 364/DIG. 1; 364/969.2; 364/DIG. 2
[58] Field of Search ............... 364/200, 900; 395/650, 395/725

[56] References Cited

U.S. PATENT DOCUMENTS

| | | | |
|---|---|---|---|
| 4,050,095 | 9/1977 | Pettipher et al. | 364/200 |
| 4,130,865 | 12/1978 | Heart et al. | 364/200 |
| 4,224,664 | 9/1923 | Trinchieri | 364/200 |
| 4,231,086 | 10/1980 | Tarbox et al. | 364/200 |
| 4,399,504 | 8/1983 | Obermarck et al. | 364/200 |
| 4,435,766 | 3/1984 | Haber et al. | 264/200 |
| 4,480,304 | 10/1984 | Carr et al. | 364/200 |
| 4,587,609 | 5/1986 | Boudreau et al. | 364/200 |
| 4,604,694 | 8/1986 | Hough | 364/200 |
| 4,716,528 | 12/1987 | Crus et al. | 364/200 |
| 4,835,672 | 5/1989 | Zenk et al. | 364/200 |
| 4,965,719 | 10/1990 | Shoens et al. | 364/200 |

OTHER PUBLICATIONS

Sekino et al., "The DCS-A New Approach to Multisystem Data Sharing", Jul. 1984, National Computer Conference, pp. 59-68.
Tyer et al., "Analysis of Trade-Offs in Distributed Locking for Transaction Processing Systems", 1988, Computer Performance & Reliability pp. 417-429.
Dias et al., "Token Ring-Based Distributed Lock Manager," Dec. 1987, IBM Technical Disclosure Bulletin, vol. 30, No. 7, pp. 263-266.
Kronenberg et al., "VAX clustors: A Closely-Coupled Distributed System", May, 1986, ACM Transactions on Computer Systems, vol. 4, No. 2, pp. 130-146.
Strickland et al., "IMS VS:An Evolving System" 1982, IBM System J, vol. 21, No. 4, pp. 490-510.
Dias et al., "Tradeoffs Between Coupling Small and Large Processors for Transaction Processing", Apr. 1988 IEEE Transactions on Computers vol. 37, No. 3 pp. 310-320.

Primary Examiner—Michael R. Fleming
Assistant Examiner—Glenn A. Auve
Attorney, Agent, or Firm—Ratner & Prestia

[57] ABSTRACT

A multi-processor computer system in which each processor is under the control of separate system software and access a common database. A two level lock management system is used to prevent data corruption due to unsynchronized data access by the multiple processors. By this system, subsets of data in the database are assigned respectively different lock entities. Before a task running on one of the processors access data in the database it first requests permission to access the data in a given mode with reference to the appropriate lock entity. A first level lock manager handles these requests synchronously, using a simplified model of the locking system having shared and exclusive lock modes to either grant or deny the request. All requests are then forwarded to a second level lock manager which grants or denies the request based on a more robust model of the locking system and queues denied requests. The denied requests are granted, in turn, as the tasks which have been granted access finish processing data in the database.

11 Claims, 14 Drawing Sheets

LEVEL 1 LOCK MANAGER 30

MULTILEVEL LOCKING SYSTEM AND METHOD

FIELD OF THE INVENTION

The present invention relates generally to system which controls access to resources and data in a multiprocessing environment and in particular to a multilevel resource lock management method and system.

BACKGROUND OF THE INVENTION

It is well known that several relatively slow processors executing respective multiple tasks in parallel may perform more efficiently than one relatively fast processor executing the same tasks serially. However, the performance gained by using multiple processors depends both on how many processors are used and on the manner in which they are coupled.

One method of coupling processors is to have them operate under control of a single operating system, sharing a byte addressable main memory. A system having this architecture is commonly referred to as a tightly coupled system. Tightly coupled architectures appear to be limited to a maximum configuration of approximately eight processors due to physical limitations such as packaging constraints, as well as limitations inherent to the architecture such as cache coherency and contention in critical sections of the operating system.

A closely coupled architecture avoids many of these problems. In a closely coupled system, multiple data processing systems, each under the control of its own operating system, are joined by a communications network and have direct access to common resources such as a memory module or disk drive. Closely coupled systems are distinguished from loosely coupled systems. The processors in a loosely coupled system generally do not have direct access to a common resource. In a closely coupled system, access to the common resources is coordinated by a set of protocols which are implemented in each of the respective systems software.

Closely coupled systems have several advantages over tightly coupled systems. For example, system structure does not change when a new processor or common resource is added, load balancing and database design are simplified since individual tasks or transactions can be run on any of the coupled processing systems, and the failure of an individual processing system does not necessarily lead to a loss of access to the data. Exemplary closely coupled systems are described in a paper by J. P. Strickland et al. entitled "IMS/VS: An Evolving System", *IBM Systems Journal.* Vol 21, No. 4, 1982 PP 490-510 and in a paper by N. P. Kronenberg et al. entitled "VAXclusters: a Closely-Coupled Distributed System", *ACM Trans. on Computer Systems.* Vol. 4, No. 2, May, 1986, PP 130-146.

There are, however, disadvantages to using a closely coupled computer system for resource sharing. One disadvantage relates to interprocess communication, that is, when a first task, running on one processor needs to communicate with a second task, running on another processor. This may occur when the first task wants to access common data that is currently being manipulated by the second task. For example, in a banking system, the first task may be a customer withdrawing money from his account using an automatic teller machine and the second task may be the bank updating his account to process a check. If these tasks are not synchronized, the resulting account balance may be incorrect.

One method of synchronizing tasks in a data sharing environment is known as locking. By this method, a task first obtains access to a data structure known as a lock and then indicates the type of access that is desired in order to either read or modify data in the database that is protected by the lock. Other tasks are prevented from accessing the protected data until the one task changes the indication of the type of access desired and releases the lock so that the other tasks may access it.

In closely coupled multiprocessor data sharing systems, a global lock manager is provided to resolve lock requests among tasks running on different processors and to maintain queues of tasks awaiting access to particular lock entities. A global lock manager of this type typically relies on synchronous inter-processor communication to manage the lock entities. That is to say, a first task requesting a lock entity may interrupt second task running on a different processor and hold the second task interrupted until the availability of the lock entity is resolved. This synchronous inter-processor communication increases the response time of the both tasks, causing an apparent increase in the utilization of system resources such as memory, address spaces and locks. This, in turn, tends to increase inter-task contention for these resources, resulting in an increased need for inter-processor communication.

To solve this problem, the requesting task may be suspended if the global lock manager needs to communicate with another processor to resolve the lock request. However, this entails a rescheduling penalty for the suspended task and results in elongation of transaction response and resource holding times.

From the above, it can be understood that inter-processor communication overhead is a key source of performance degradation in a closely coupled data sharing architecture. The inventors have determined that the process of obtaining and releasing a lock may add on the order of several hundred instructions while the overhead for an inter-processor communication operation may be as high as several thousands of instructions. Any locking method which could reduce this overhead would necessarily increase the performance of the shared-data system.

There are many ways to approach global lock management. One method is to distribute the locking function among the coupled processors. By this method, an attempt is made to resolve the lock requests from within the processor. Whenever this is not possible, communication with a remote processor is initiated to resolve the lock request. Distributed locking protocols generally divide the lock space into multiple partitions which are assigned to respective ones of the coupled processors. Requests for an entity (i.e. a particular lock data structure) are sent to, and resolved by the processor which owns the partition to which the entity belongs.

The lock space may be partitioned statically or dynamically. In a static lock partitioning scheme, the assignment of entities to processors is fixed. In dynamic partitioning schemes, the processor which is executing a task that first requests a particular lock entity, is assigned the partition to which the entity belongs. Subsequent requests for entities in this partition are resolved by this processor until no lock entities in the partition are held by the owning processor. In this instance, the processor releases ownership of the partition, which is then acquired by the next processor that requests a lock in the partition.

This dynamic partitioning scheme exploits a locality property which is commonly found in data base or file access program suites. According to this property, during any relatively short time interval, tasks tend to request lock entities that protect a related set of data records. Consequently, if these lock entities may be assigned to the same partition, the dynamic partitioning can reduce the probability of sending a lock request from one processor to another.

However, in environments where there is a high degree of multiprogramming or in systems including a relatively large number of coupled processors, it is likely that two consecutive requests for entities in one partition may originate from different processors. This problem may be resolved by increasing the number of classes but doing so adversely affects the locality behavior.

The paper by Strickland et al., referred to above, describes a locking protocol in which one global locking table is continuously circulated among the coupled processors. A request for a lock is granted only when all of the processors agree to the request. This scheme results in a relatively large inter-processor communication delay since each processor is interrupted to examine the request and convey the table to the next processor.

U.S. Pat. No. 4,224,664 to Trinchieri relates to a method for concurrency control which is known in the literature as serialization graph checking. By this method, two memories are accessed to grant or deny a request for a lock entity. The first memory holds a utilization graph that identifies which processes access which data items. The second memory contains a serialization graph that identifies precedence relationships among the processes (i.e. that one process must occur in time before the other process). This graph is used to deny the lock if granting it would result in a deadlock condition or in a situation in which two tasks would need precedence over each other.

SUMMARY OF THE INVENTION

The present invention is embodied in a multi-level data access management scheme for use in a computer system having coupled processing elements. According to this scheme, a global table is maintained which records the states of all lock entities that have been procured. When a task attempts to procure a lock entity, it sends a request to a first level access manager which checks this table for compatibility between the request and the current state of the lock entity. If the request is found to be compatible, it is granted and, if necessary, the new state of the lock is recorded in the global table. If the request to the first level access manager is denied, a second request is sent to a second level access manager which queues the request for the entity. This second request is sent asynchronously, while the requesting task is suspended.

According to another aspect of the invention, if the request and the requested entity are found to be compatible by the first level access manager, the requesting task sends a request for the lock to the second level manager to update the status of the lock entity. The requesting task continues execution while this request is sent to the second level manager.

According to yet another aspect of this invention, the global table also includes an indication of exclusive lock status. If a lock entity is found in the global table but without this indication of exclusive status, multiple simultaneous requests for the lock entity may be granted.

According to yet another aspect of the invention, the first level lock manager is implemented as dedicated circuitry having a dedicated access path to each of the coupled processors.

DETAILED DESCRIPTION

Overview

Figure 1:
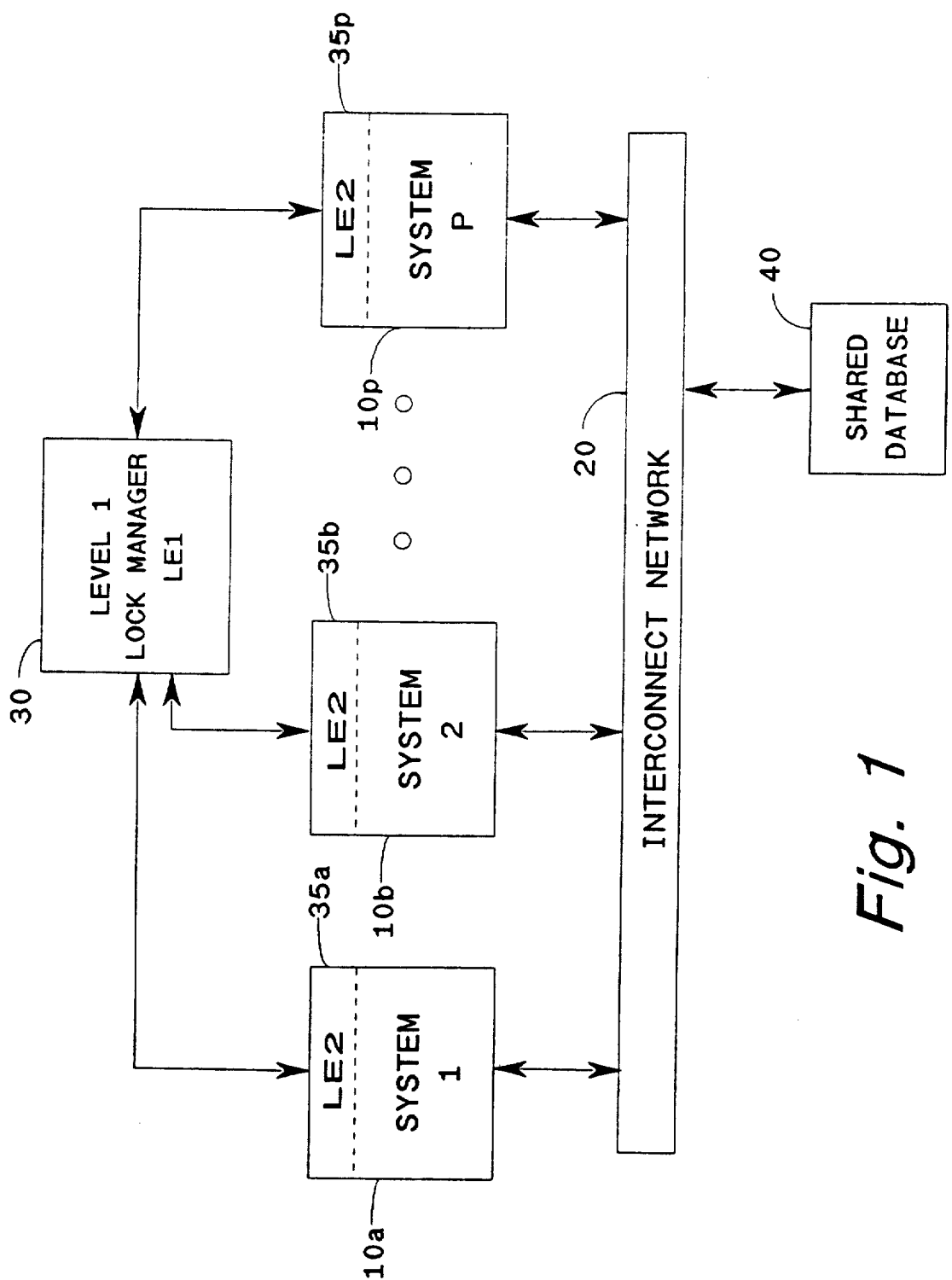
FIG. 1 is a closely coupled computer system which includes an embodiment of the invention.

An exemplary closely coupled data processing system which includes an embodiment of the present invention is shown in FIG. 1. This system includes P separate subsystems, 10a through 10p, where P is an integer. Each subsystem may be a single processor or a group of tightly coupled processors which are under the control of a single operating system. The subsystems are connected to each other and to a shared database 40 via an interconnecting communications network 20. In this embodiment of the invention, the subsystems 10a through 10p are also coupled to a level 1 lock manager 30. A level 2 lock manager 35 is implemented in software, for example, as a part of the system software, in each of the subsystems 10a through 10p.

In general terms, the lock managers 30 and 35 implement a two level data access management system for the data in the shared database 40. The level 1 lock manager (LE1) 30 can be accessed by all of the coupled subsystems. However, LE1 only performs part of the lock management function; it detects if there is possible contention between two lock requests. The remainder of the lock management function (e.g. resolving situations where the possible contention detected at LE1 does not exist and maintaining queues of denied requests) is handled by the level 2 lock manager (LE2) 35. Because of its simplicity, the LE1 30 may be implemented either in shared hardware or in a program (not shown) which may run on all of the subsystems which access shared memory (not shown). If LE1 30 is implemented as a shared hardware device, it is contemplated that the connection between the processors 10a through 10p and LE1 30 may be either via dedicated channels as shown or via the interconnect network 20.

The level 2 lock manager 35 performs the remainder of the functions of a conventional lock management system. These functions include maintaining queues of waiting requests and resolving potential conflicts noted by LE1 30 which are not conflicts for LE2 35. In this embodiment of the invention, LE2 35 is implemented as P separate processes 35a through 35p which are assigned to the respective subsystems 10a through 10p, respectively. Each of the LE2 processes is assigned a distinct subset of lock entities, as described below. In operation, a task which needs to access protected data in the database 40 first attempts to obtain the needed lock from the LE2 35 associated with its subsystem. If this LE2 controls the lock, it requests the lock from LE1 30 before assigning it to the requesting task. Otherwise, the requesting task generates a synchronous request to LE1 30 for the lock If LE1 30 detects a possibility of contention between a request for a lock entity and a currently granted request for the same lock entity, then the subsystem 10 which initiated the request is conditioned to suspend the task that generated the pending request and to send an asynchronous request to the LE2 35 that currently owns the requested lock entity.

If LE1 30 does not detect a possibility of contention, the returned ACK message allows the requesting task to continue. In a first embodiment of the invention, an ACK message conditions the requesting task to send a second request for the lock entity, asynchronously, to LE2 35 while the requesting task continues execution. This request conditions LE2 35 to update its lock table and perform other bookkeeping operations. In a second embodiment of the invention described below, an ACK message received from LE1 30 terminates the request. Requests are only sent to LE2 in response to a NAK message from LE1. The flow charts shown in FIGS. 3 through 13 relate to the processing performed by the LE1 30 and LE2 35 of the first embodiment of the invention. The equivalent operations performed by the second embodiment are described only as they differ from the first embodiment.

In these embodiments of the invention, the synchronous request to LE1 30 is handled by interrupting the execution of the requesting task until LE1 30 has processed the request and provided the response. The asynchronous request to LE2 35 is handled by transmitting a message over the interconnect network 20. Depending on the message (ACK or NAK) returned by LE1 30, the requesting task may be suspended or may continue execution while this message is being transmitted and processed.

Thus, the requesting task is subject to overhead relating to the time delay waiting for a response from LE2 35 only when there is a possibility of contention between two lock requests. When there is no potential of contention, which should be the norm for a well tuned system, the only time delay for the requesting task is for the invocation of LE1 30. In this instance, the processing for the granted lock request, performed by LE2 35 proceeds concurrently with processing performed by the requesting task.

While the present invention is described in terms of a data management system for controlling access to data in a shared database, it is contemplated that it may also be used to manage access to other shared resources such as peripheral devices and special purpose processing elements.

DETAILED DESCRIPTION OF THE PREFERRED EMBODIMENT

In this embodiment of the invention, LE1 30 maintains a list of lock entities which have been obtained by tasks running on the processors 10a through 10p. If a lock entity has not been obtained, then there is no entry for the entity in the LE1 lock table. In this example, the individual lock entities are arranged in hash classes and the list of locked entities is maintained using a hash table. To generate this table, the entity identifier of a lock is hashed using a conventional hashing function to produce an address of a hash bucket. For each hash bucket, a linked list of entries for the locked entities is maintained. The table entry for each locked entity contains the entity identifier, the lock mode (exclusive or share) and an in-transit count. Each of these fields is explained below.

In the following description, the notation "entity A" and "A" are used to denote a lock entity having the identifier "A". The address of the entity A in the lock table is represented by H(A) where the function H(x) is the hashing function. The in-transit count associated with the entity is referred to as COUNT (H(A)) and the mode or state of the lock entity is referred to as STATE (H(A)).

STATE (H(A)) may be either share (SHR) or exclusive (EXC). These are the only lock modes that are recognized at LE1 30. However, additional lock modes are recognized at LE2 35. These include intent exclusive (IEX) and intent share (ISH). For the checking performed by LE1, IEX and EXC map into the EXC state while ISH and SHR map into the SHR state. The compatibilities of the various lock states at LE2 35 is indicated by the following Table.

TABLE

| Lock State | Compatible Request States |
|---|---|
| EXC | none |
| IEX | IEX, ISH |
| SHR | SHR, ISH |
| ISH | IEX, SHR, ISH |

COUNT (H(A)) is an integer value less than or equal to a defined maximum value (MAX). COUNT (H(A)) indicates the number of share mode requests which have been granted by LE1 30 and have not yet been processed by LE2 35. These requests may be considered to be in-transit from the requesting task to the LE2 35. In a special case described below, MAX is defined to have a value of one.

The only compatibility checking implemented in LE1 30 is to allow a share request for a lock entity having a share state, to disallow an exclusive request for any held lock and to disallow any request for a lock entity having an exclusive state.

LE2 35 is a general lock manager. It handles all types of lock requests including exclusive, intent exclusive, share, and intent share LE2 includes a pending request list to re-test each request that was denied by LE1 30 to determine if it is truly incompatible or was just mapped into an incompatible state. In addition, LE2 35 maintains queues of requests for entities which are locked in an incompatible mode, sends messages to the subsystems 10a through 10p when locks requested by suspended tasks can be granted, and sends unlock requests to LE1 30. In this embodiment of the invention, LE2 35 is implemented as a distributed system. Each subsystem 10a through 10p includes a copy of LE2, 35a through 35p, respectively. Each copy of the LE2 lock manager is assigned one or more hash classes of lock entities. In this embodiment of the invention, the subsystem 10a through 10p to which a particular hash class is assigned can be determined from the hash function applied to a lock entity identifier.

LE2 35 may use the same hashing function, H(x), as is used by LE1 30 to maintain its table of locked entities. This lock table may be accessed in a manner identical to that used for the LE1 lock table. Each entry in the table contains a count (HCOUNT) of tasks that hold the lock, a pointer to a list of these tasks, a list of queues associated with the lock entity, one queue for each type of lock state, and a list of pending requests for the lock entity as described below in reference to FIGS. 2 and 8-13. Alternatively, there may be one queue for each lock entity containing both share (SHR and ISR) and exclusive (EXC and IEX) requests which are processed in a first-in-first-out order.

Each entry in the list of tasks that hold the lock includes information on the subsystem 10a through 10p which made the request, an identifier for the request itself and an indication of the requested state or mode. Each queued entry includes information on the subsystem 10a through 10p which made the request, an identifier for the particular request, the request mode, and optionally, a time-stamp which may be used to select the next request to be granted.

In the example that follows, a task running on a subsystem, for example, 10a, makes lock requests for exclusive or share access to data in the database 40 which may be accessed by any of the subsystems 10a through 10p. Prior to accessing this data, the task obtains a lock entity to prevent data corruption. To obtain this lock, the task first attempts to access the lock entity in its own subsystem, 10a. If the lock does not belong to this subsystem, the requesting task sends a message, through the system software of the subsystem 10a on which it is running, to LE1 30. This message, which may be implemented as an instruction in the instruction set of the requesting processor, provides the entity identifier (e.g. A) and the type of request share (SHR) or exclusive (EXC). LE1 determines if the request is compatible with the current states of locks in LE1 and either grants or rejects the request by sending an acknowledge message (ACK) or a not acknowledge message (NAK) to the system software associated with the requesting task.

For an ACK response, the system software assumes that the lock is granted and allows the requesting access to the protected data. For a NAK request, the system software suspends the task. According to the first embodiment of the invention, the ACK response completes the lock request. According to the first embodiment of the invention; in response to either an ACK or a NAK message or, according to the second embodiment of the invention, only in response to a NAK message; the system software running on the requesting processor generates an asynchronous lock request to the LE2 which owns the requested entity. This request indicates the entity identifier, the type of access requested and the response from LE1 30. In the case of a NAK response from LE1 30, when the LE2 35 can grant a request, it sends a message to the system software associated with the requesting task, so that the requesting task may resume processing.

As set forth above, the communication between the requesting task and the lock managers LE1 30 and LE2's 35a through 35p may be handled through the system software packages available to the various subsystems 10a through 10p. However, to simplify the explanation of the lock manager functions in the materials that follow, this communication is assumed to be handled by the requesting task itself.

Figure 1A:
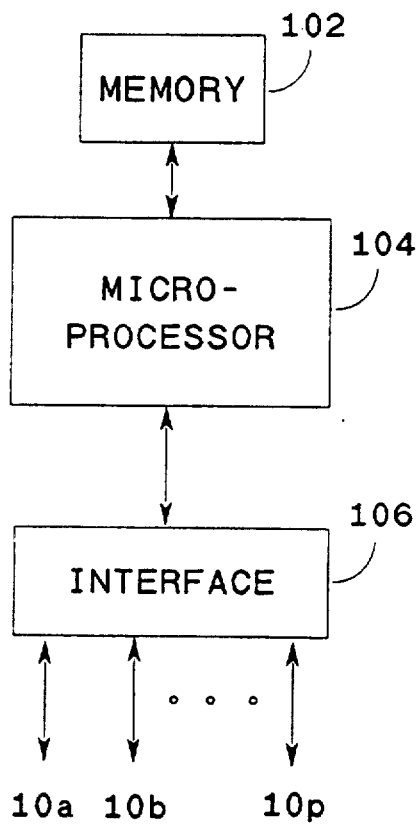
FIG. 1A is a block diagram of a first level lock manager suitable for use in the system shown in FIG. 1.

Exemplary circuitry suitable for use as the level 1 lock manager 30 is shown in FIG. 1A. This circuitry includes a microprocessor 104 which is coupled to the individual subsystems 10a through 10p via an interface unit 106. The interface unit 106 may, for example, implement a round-robin priority scheme to ensure that each of the subsystems 10a through 10p has equal access to LE1.

The lock table used by LE1 and the program which controls the microprocessor 104 to perform the level 1 lock management functions reside in a memory 102. This program is described below in reference to FIGS. 3-7.

Figure 2:
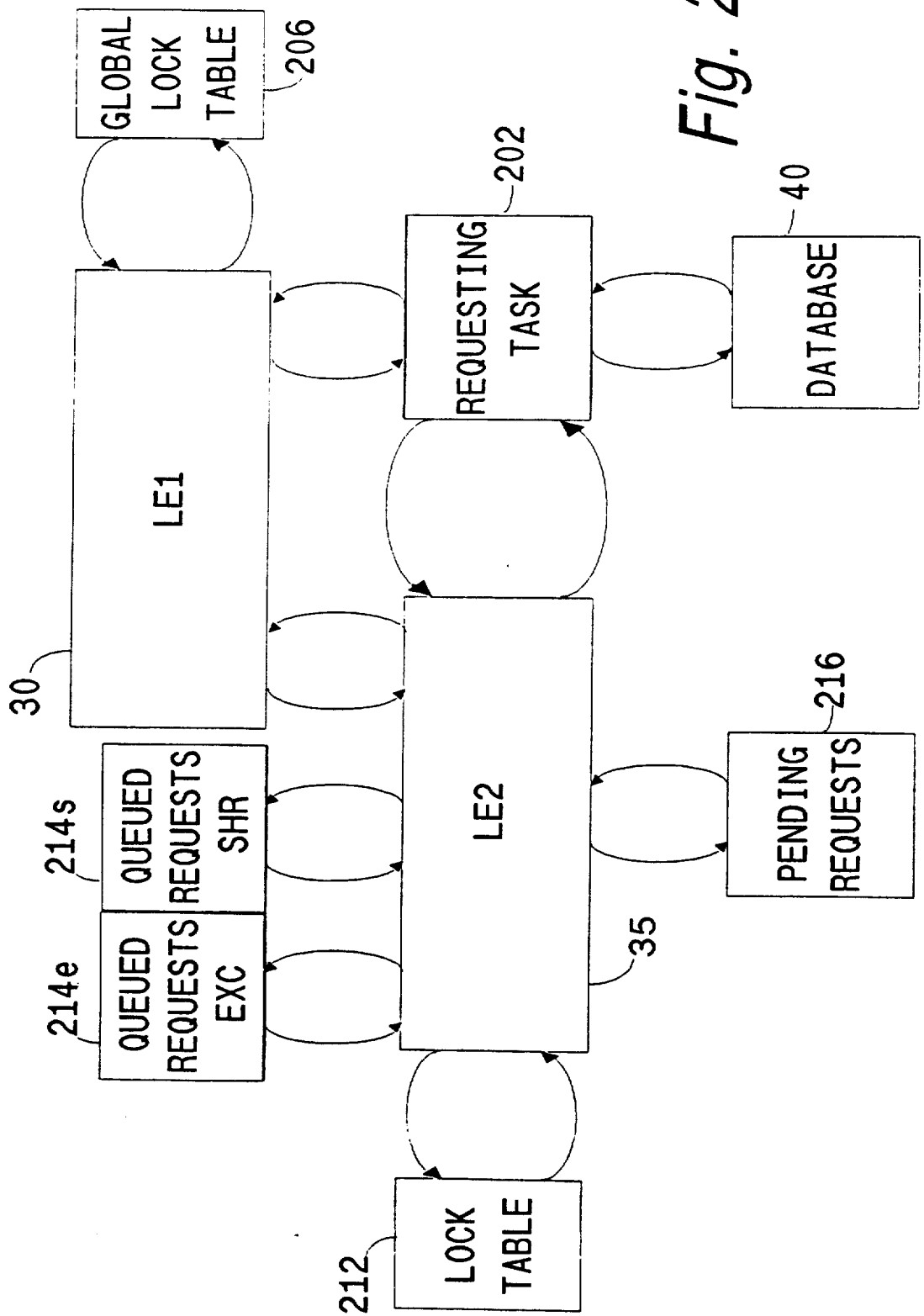
FIG. 2 is a control data flow graph that is useful for describing the operation of the present invention.

FIG. 2 is a flow diagram which illustrates the possible data paths and control flow between a requesting task 202, the lock managers LE1 30 and LE2 35 and the database 40. This flow diagram also illustrates data structures such as lock table 212, queued request lists 214e (for exclusive requests) and 214s (for shared requests), and pending request list 216 coupled to LE2 35, and the global lock table 206 coupled to LE1 30. The arrows between the blocks indicate message traffic between the requesting task and the lock managers LE1 30 and LE2 35. The arrows between the tasks and lock managers on the one side and the various data structures on the other side, represent data accesses. The flow graph shown in FIG. 2 is referred to below in the discussion of FIGS. 3-13.

Figure 3:
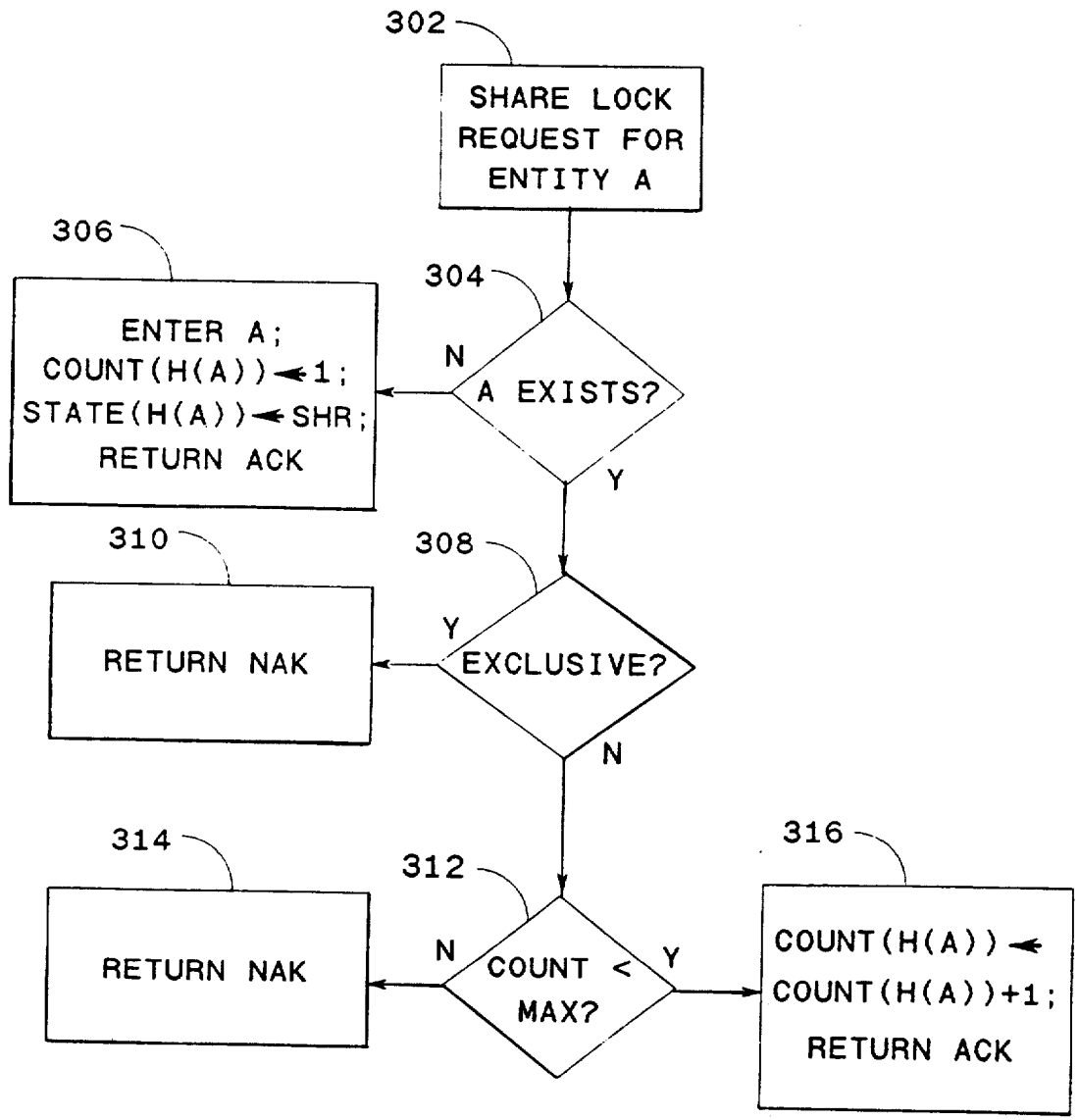
FIGS. 3-7 are flow-chart diagrams which are useful for describing the operation of the level 1 lock manager shown in FIG. 2.

FIG. 3 is a flow chart diagram representing the steps performed by LE1 30 in response to a share request for a lock entity A. In response to this request at step 302, LE1 30 at step 304 accesses its lock table to determine if it contains an entry for A. If no such entry is found, step 306 is executed which establishes an entry for A, having a state of SHR and an in transit count of 1. In addition, step 306 returns an ACK message to the requesting task.

If an entry for the entity A is found at step 304, LE1 30 executes step 308 to determine if the request is for exclusive access to the protected data. If so, LE1 returns a NAK message to the requesting task at step 310. If the request is not exclusive, step 312 is executed to determine if the number of requests for the entity which have not yet been processed at LE2 is less than the maximum in-transit count MAX. If so, LE1 30 increments the in-transit count and returns an ACK message at step 316. Otherwise, LE1 30 returns a NAK message at step 314.

As set forth above, the maximum in-transit count, MAX, may be set to have a value of one. This may be implemented as an EXC lock on a separate lock entity A$ for each entity A that is SHR locked in LE1 30. In this implementation, LE2 35 unlocks A$ in LE1 30 when it receives the request for A. This simplifies the implementation of LE1 30 since the decrement count operation is no longer provided by LE1. However, in this implementation, there may only be one SHR/ACK request in transit to LE2 for a particular entity at any given time. For most lock management operations this should be sufficient if the time to send an asynchronous request to LE2 35 is relatively small (on the order of milliseconds).

According to the second embodiment of the invention, the LE1 30 does not recognize a SHR state; all lock requests are assumed to be exclusive. The LE1 lock table entries also include a field which indicates which processor currently owns the lock or if the lock is owned by LE2. If LE1 30 cannot find an entry for a requested lock it returns an ACK response otherwise it returns a NAK response. The requesting task only sends a request to LE2 when it receives a NAK response. This request includes the identity of the requested lock entity, the type of request, the NAK response from LE1 and the contents of the lock-owner field for the lock entity in the LE1 lock table 206.

Figure 4:
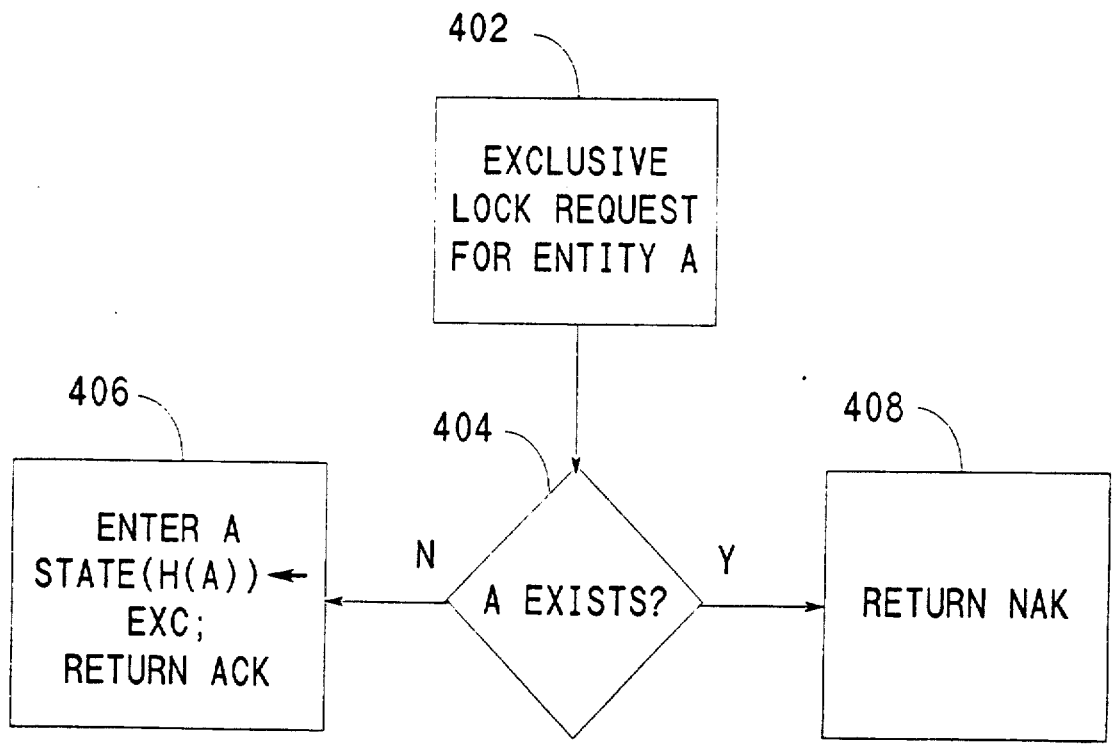

FIG. 4 is a flow-chart diagram representing, for the first embodiment of the invention, the steps performed by LE1 30 in response to an exclusive lock request (step 402) for entity A. For the second embodiment of the invention, this represents the steps performed by LE1 for any lock request.

The first step, 404, searches the lock table for an entry corresponding to the entity A. If no entry is found, the step 406 is executed which creates an entry for A having an exclusive state. The in-transit count is irrelevant for locks having exclusive states since, at any given time. there may only be one granted request. After this entry has been created in the lock table, LE1 30 returns an ACK message to the requesting task. If, at step 404, an entry for the entity A is found, LE1 30 returns a NAK message to the requesting task as indicated by step 408.

Figure 5:
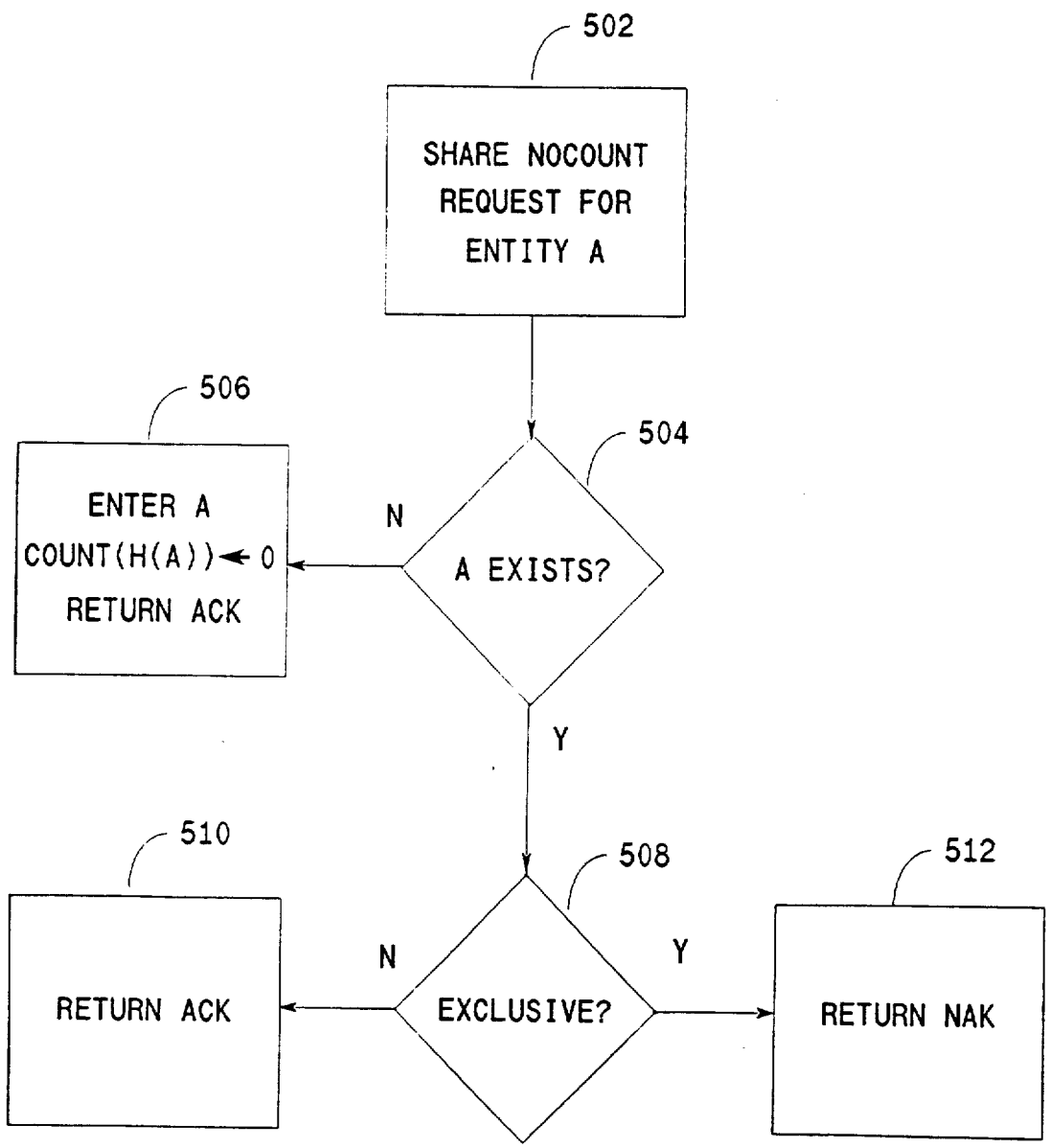

FIG. 5 illustrates the steps performed by LE1 30 in the first embodiment of the invention in response to a share no-count request for a lock entity A. This request is generated by an LE2 35. A request of this type may be generated, for example, as a part of processing pending requests (described below) or when a task requests shared access to protected data and the requested lock entity belongs to the subsystem on which the requesting task is running.

As set forth above, before it sends a message to LE1, the requesting task attempts to obtain the requested lock entity from the LE2 35 running on its subsystem. If the lock entity A is found, the LE2 35 sends a share no-count request to LE1 30. The main difference between this type of request and a share request is that the in-transit count for the lock entity is not incremented, since the request originated from LE2.

In response to the share no-count request for an entity A at step 502, LE1 determines, at step 504, if an entry for the entity A exists in its lock table 206, shown in FIG. 2. If no entry is found, then, at step 506, LE1 creates an entry for A in the table 206, sets the in-transit count value for the entry to zero and returns a synchronous ACK message to the requesting LE2.

If an entry for the entity A is found at step 504, step 508 is executed to determine if the state of the found entry is exclusive. If so, step 512 sends a synchronous NAK message to the requesting LE2. Otherwise, step 510 sends a synchronous ACK message to the LE2.

Figure 6:
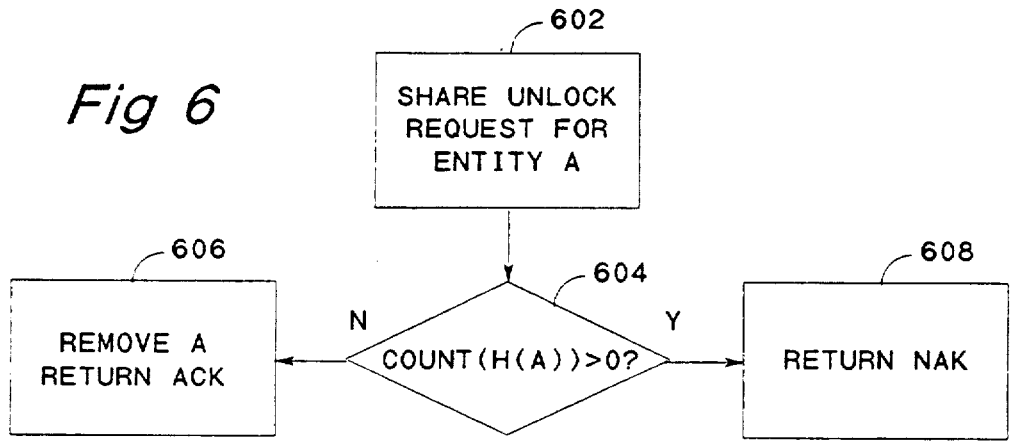

FIG. 6 illustrates the steps performed by LE1 30, in the first embodiment of the invention, in response to a request to unlock a shared lock entity A. In this embodiment of the invention, a request of this type is generated by an LE2 35 when all of the tasks, which have requested the lock entity A in a shared state, have accessed the protected data and released the entity A.

In response to a request of this type at step 602, LE1 30, at step 604, determines if the in-transit count for the lock entity A is greater than zero. If so, there are some lock requests which have not yet been processed by the LE2 35 so LE1 30 returns a NAK message to the requesting LE2 35. If, however, it is found at step 604 that the in-transit count for the entity A is zero, step 606 is executed to remove the entry for the entity A from the lock table 206 and then return an ACK message to the requesting LE2 35.

Figure 6A:
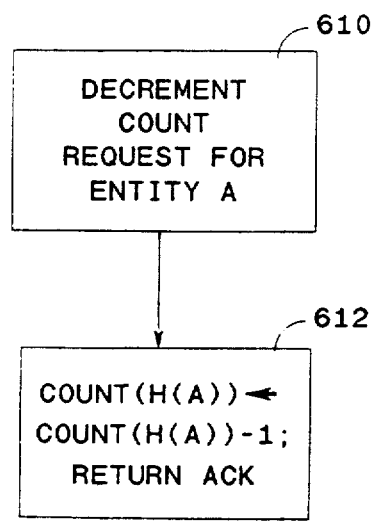

When a LE2 35 begins to process an asynchronous SHR request for an entity A, that request is no longer in-transit. Accordingly, the LE2 sends a message to the LE1 30 to decrement the count of in-transit requests associated with the lock entity. The flow-chart diagram of FIG. 6A shows the steps performed by the LE1 30 in response to such a request. When the request is received at step 610, LE1 30 decrements the count value for the lock entity at step 612 and returns an ACK message to the requesting LE2 35.

Figure 7:
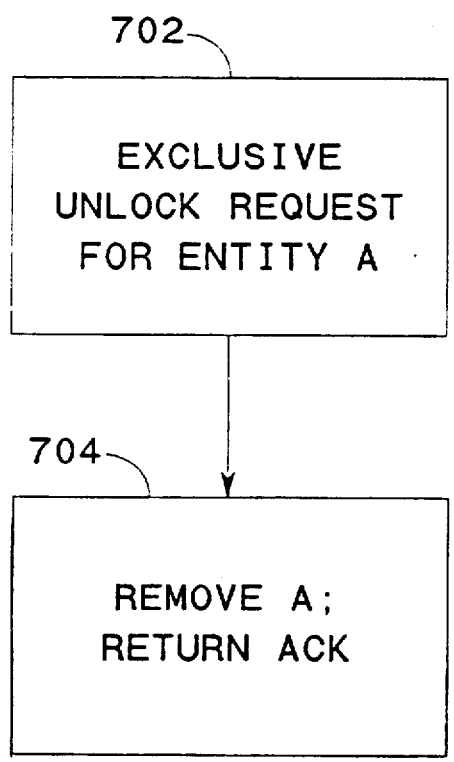

FIG. 7 is a flow-chart diagram which shows the response of LE1 to an exclusive unlock request. A request of this type is generated by an LE2 35 when the entity A is released by a task which held the entity A as an exclusive lock. In response to this request at step 702, LE1 30, at step 704, removes the entry for the entity A from the lock table and returns an ACK message to the requesting LE2 35.

For the second embodiment of the invention, only conditional unlock requests are sent to LE1 and these requests are only sent if LE1 originally granted the lock request. If LE1 finds the lock entity owned by the requesting processor it deletes the entry and returns an ACK response. If LE1 finds the lock entity owned by another processor or by LE2 it returns a NAK message. In response to a NAK message from LE1 30, the requesting task sends an unlock request to LE2 35.

FIGS. 8-13 are flow-chart diagrams which show the steps performed by any of the LE2's 35a through 35p in the first embodiment of the invention, in response to asynchronous lock and unlock requests. The steps shown in these flow-charts relate to the interface between LE1 30 and LE2 35; they do not describe the more conventional aspects of the locking functions performed by LE2 35 such as queue management. In these flow-charts, the step "GRANT REQUEST" includes all of the checking operations normally performed by a conventional lock manager which are not otherwise described. These techniques are well known to one ordinarily skilled in the art of developing software for resource management in computer systems.

Figure 8:
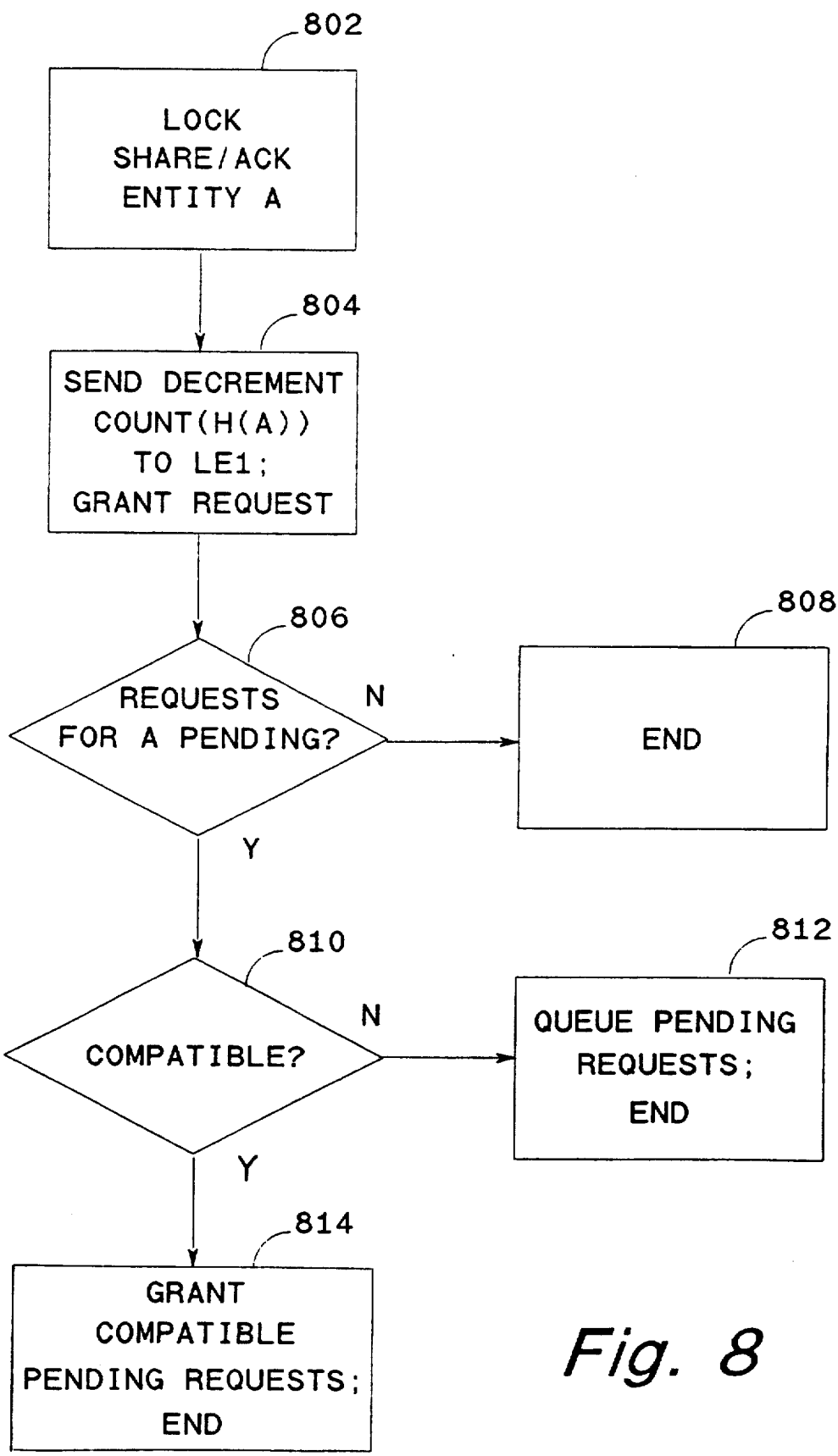
FIGS. 8-13 are flow-chart diagrams which are useful for describing the operation of the level 2 lock manager.

FIG. 8 is a flow-chart diagram of the steps performed by an LE2 35 in response to an asynchronous request for lock entity A in share mode when the synchronous request to LE1 30 has returned an ACK response. An asynchronous request, which includes the response from LE1, is received by the LE2 which owns the entity A at step 802. At step 804, the LE2 35 sends a request to LE1 30 to decrement the in-transit count for the entity A. Next, the LE2 35 grants the request. The step of granting the request may include updating the entry in the lock table 212 of FIG. 2 for the entity A. Since the request is a share request, the LE2 35, at step 806, determines if there are any entries in the pending request data structure 216 of FIG. 2 for the entity A. If not, the LE2 stops processing the request at step 808.

If, however, there are pending requests at step 806, the LE2 determines, at step 810, if any of the pending requests are compatible with the state of the entity A. That is to say, if any of the pending requests are SHR, or ISH requests if the granted request was a SHR request or if any of the pending requests are IEX, SHR or ISH if the granted request was an ISH request. If either of these conditions is found, the compatible pending requests are granted and the appropriate messages are sent to the requesting tasks at step 814 so that they may resume execution. If none of the pending requests are compatible with the request granted at step 804, they are added, at step 812, to the queue 214e (for IEX and EXC) of FIG. 2, as the last step in processing the share-/ACK request. The generation of pending requests is described below in reference to FIGS. 10 through 13 while the handling of queued requests is described below in reference to FIGS. 12 and 13.

Figure 9:
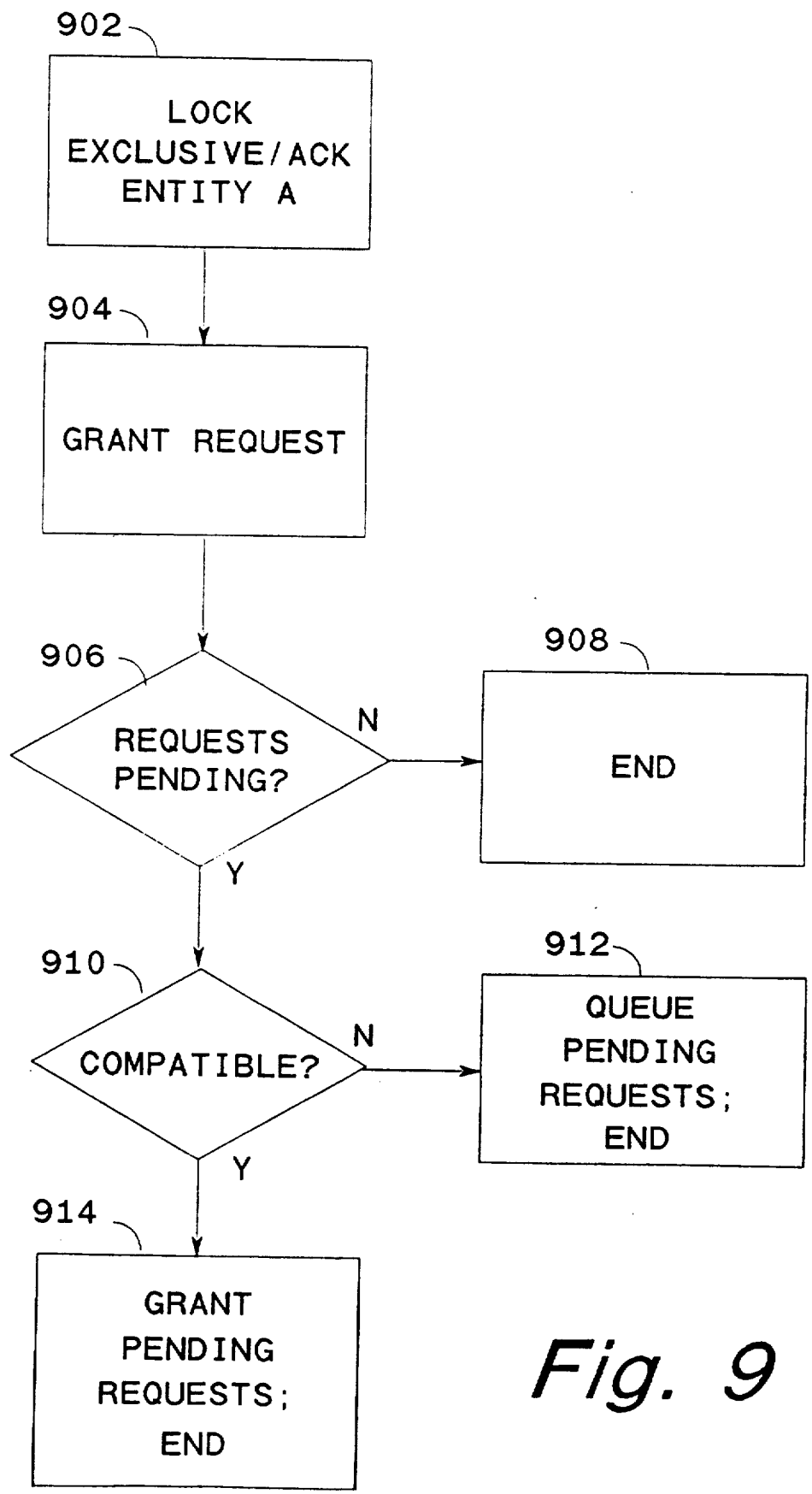

The flow-chart diagram in FIG. 9 illustrates the steps performed by the LE2 35 in response to an asynchronous request for a lock entity A in the exclusive state, where LE1 30 has returned an ACK response. After receiving the request at step 902, the LE2 35 grants the request at step 904. Since LE1 30 has returned an ACK, LE2 does not need to determine if the request is compatible with the current state of the lock entity. The step 904 may include the step of updating the entry for the lock entity A in the table 212 of FIG. 2.

After the request has been granted at step 904, LE2 35 determines if there are any requests in the pending request list 216 of FIG. 2. If so, the pending requests are examined at step 910 If the original request was EXC then no pending requests may be compatible. However, if the original request was IEX, then pending IEX and ISH requests are compatible. If any pending requests are found to be compatible, they are granted at step 914. Incompatible pending requests are added, at step 912 to the queued request lists 214e and 214s of FIG. 2 and processing for the request ends. If no pending requests are found at step 906, LE2 processing for the exclusive/ACK request ends at step 908.

In the second embodiment of the invention, there is no counterpart to FIGS. 8 or 9 since, when an ACK message is received from LE1 30, no message is sent to LE2 35.

Figure 10:
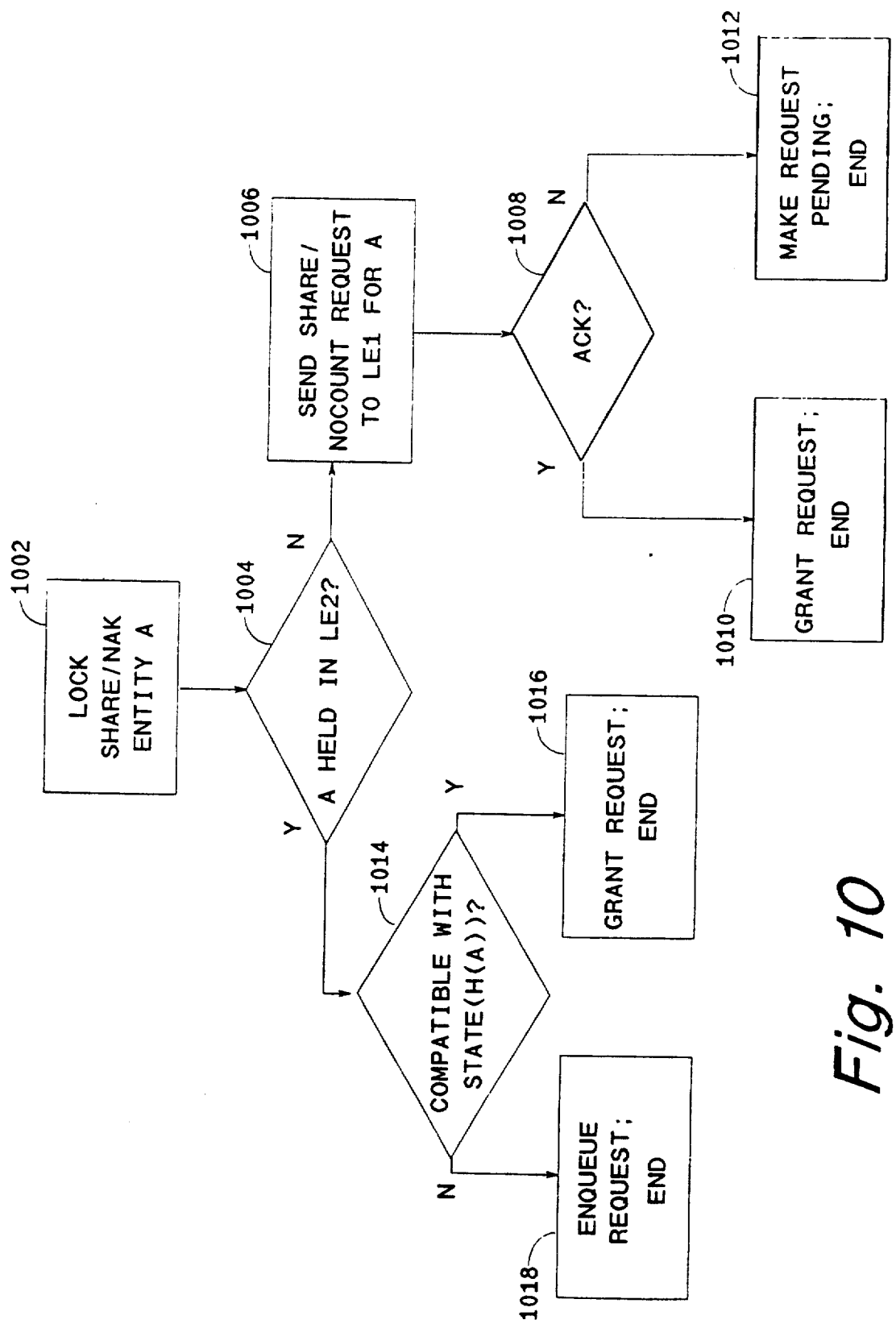
Figure 11:
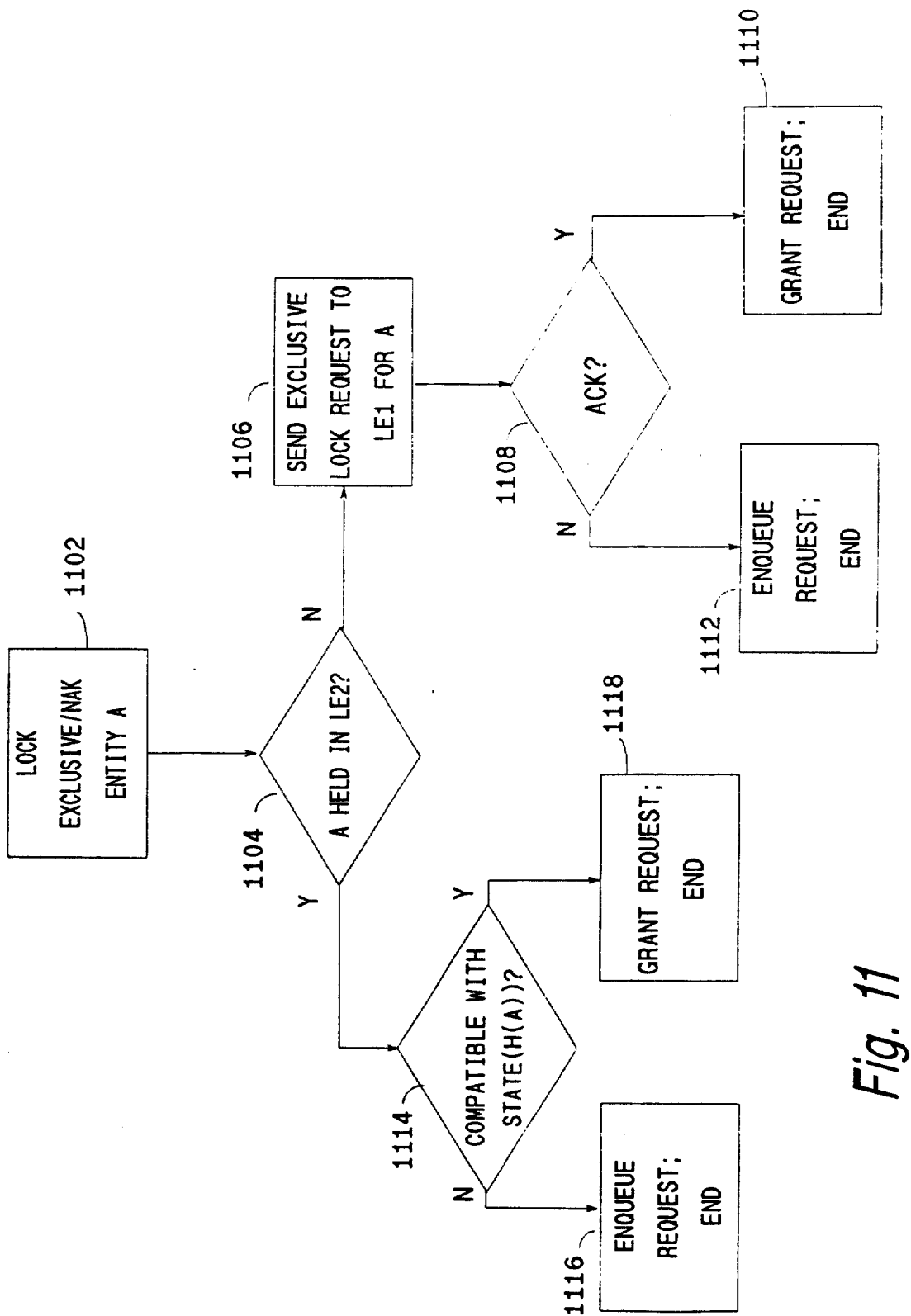

FIGS. 10 and 11 describe the processing, in LE2 35 of the first embodiment of the invention, of a share or exclusive request, respectively, where the LE1 response accompanying the request is a NAK. The processing steps shown in these two flow-chart diagrams include steps which handle race conditions between asynchronous messages for the same lock entity. These race conditions may occur in two situations which are illustrated by examples. In the first example, a task T1 requests a lock entity at LE1 and receives an ACK response. Next, task T2 requests the same lock entity, in an incompatible status, and receives a NAK response. Both tasks T1 and T2 send asynchronous requests for the lock entity to the LE2 to which it belongs, however, the request from T2 arrives before that from T1. In the second example, A task T2 requests a lock from LE1 and receives a NAK response because the lock is already held by a task T1. Before the message from task T2 is received by the LE2 35, task T1 releases the lock.

In both of the above examples, the entry for the lock entity in LE2 35 is compatible with the request from T2 but the NAK response from LE1, conveyed with the request from T2, indicates that the lock is held in LE1 in a state that is incompatible with that requested by T2. In the first example, the request from T2 should be placed in the pending request list 216 of FIG. 2, but in the second example, the request should be either be granted or placed in the appropriate queued request list 214e or 214s to be handled in turn with other similar requests.

The LE2 cannot distinguish between these two race conditions based on the messages received from T2. To do so, LE2 35 issues a request to LE1 30 for the lock in the requested status. If LE2 35 receives a NAK message then the race condition is the first case, otherwise, it is the second case.

FIG. 10 illustrates the steps performed by LE2 35 in response to an asynchronous share (i.e. SHR or ISH) request where LE1 30 has returned a NAK message. After receiving the request at step 1002, the LE2 35 determines if the requested lock is held in the lock table 212, shown in FIG. 2. If so, step 1014 is executed to determine if the requested status is compatible with the current state of the lock. If the request is for SHR or ISH states and the lock is currently held in the SHR or ISH states or if the request is for ISH state and the lock is currently held in the IEX state then the request is compatible and, so, it is granted at step 1016. However, if, at step 1014, the current status of the lock is EXC, the request is not compatible and it is placed in the queue 214s shown in FIG. 2.

If the test performed at step 1004 indicates that the lock is not held as either SHR, ISH, IEX or EXC in the lock table 212 of FIG. 2, one of the race conditions described above has occurred. In this instance, the LE2 35, at step 1006, sends a synchronous share no-count request for the entity A to LE1 35. If, at step 1008, an ACK response is received, then the request is granted at step 1010. If, however, a NAK response is received at step 1008, the request is placed into the pending request list 216 of FIG. 2. These pending requests are handled as described above in reference to FIGS. 8 and 9.

FIG. 11 is a flow-chart diagram which shows the steps performed by the LE2 35 in response to an exclusive request (i.e. EXC or IEX) for lock entity A where LE1 30 has returned a NAK response. The request is received at step 1102. Next, at step 1104, LE2 35 locates the entry for the entity A in the lock table 212 of FIG. 2 and determines if the lock is held in any of the states EXC, IEX, ISH or SHR. If so, and if the request is EXC, then the request is not compatible with the current state of the lock at step 1114, and is placed into queued request list 214 at step 1116. If the request is IEX and the lock is held in either the ISH or IEX states, then the request is found to be compatible at step 1114 and is granted at step 1118.

If, however, it is found at step 1104 that the state of the entity in the table 212 indicates that the lock is not currently held by any task, then the lock request may be the result of a race condition as described above. To resolve the race condition, LE2 35, at step 1106, sends a synchronous exclusive request for entity A to LE1 and waits for the response. If LE1 30 sends an ACK message, then, at step 1110, LE2 35 grants the request. Otherwise, at step 1112, LE2 35 adds the request to the queue 214e of FIG. 2.

In the second embodiment of the invention, when LE2 35 receives a request for a lock entity, it first checks if the entity to be locked is already known to LE2. If so, then the request is either granted or queued depending on its compatibility with the lock entity in the LE2 lock table 212. The compatibility checking performed by the LE2 35 in the second embodiment of the invention may be identical to that performed in the first embodiment.

If the entity is unknown to LE2 35 then LE1 30 is checked. This check is performed by a special request, lock/change owner. If the entity is unknown to LE2, this request is sent from LE2 to LE1 for the entity. The lock/change owner request has two possible outcomes: first, if the entity is not found in LE1 then an entry is made for the entity having its owner field is set to LE2 and an ACK response is returned to LE2 35 by LE1 30; second, if the entity is found in LE1, LE1 makes LE2 the owner Of the entity and LE1 returns the name of the old owner to LE2 along with a NAK response. In either case, LE2 creates a new entry for the entity in the table 212, tags this entry with the name of either the old owner or requesting processor and grants the request.

Figure 12:
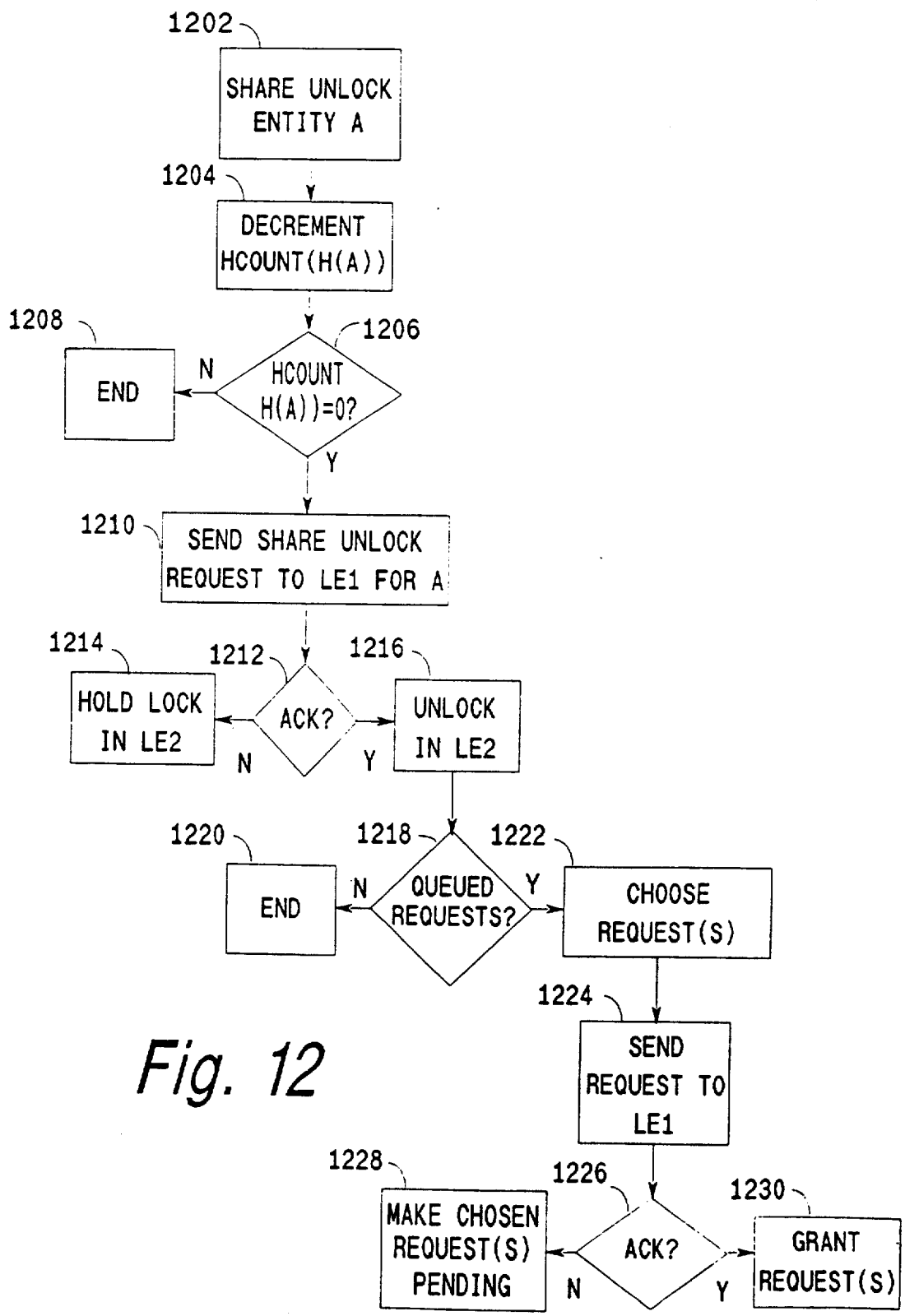

The processing, in LE2 35, of an unlock request for a lock entity A having a share state is shown in FIG. 12. After the request is received at step 1202, step 1204 is executed to decrement HCOUNT (H(A)), the count of tasks which have procured the lock entity A. This step also removes the entry for the requesting task from the task list associated with the lock entity A.

Step 1206 determines if HCOUNT (H(A)) is zero, i.e. if the lock entity A is no longer held by any task. If HCOUNT is not zero, then the processing of the unlock request is complete with the END at step 1206. If step 1206 determines that HCOUNT is zero, step 1210 is executed to send a synchronous share unlock request to LE1 30 for the lock entity A. If, at step 1212, LE1 returns a NAK message, then there may be a lock request which has not yet reached LE2 35. In this instance, LE2 retains the lock in an available state (i.e. not EXC, IEX, ISH or SHR) and ends processing for the unlock request at step 1214.

However, if, at step 1212, LE1 30 returns an ACK message, step 1216 is executed to unlock the lock entity A in the lock table 212 used by LE2 35. Next, at step 1218, LE2 35 determines if there are any queued requests for the lock entity A in the queued request lists 214e or 214s. If there are no queued requests, then the processing of the original unlock request is complete with the END at step 1220. Otherwise, one request or several compatible requests from the queued request list are chosen at step 1222 and a request for the lock is forwarded to LE1 at step 1224. This request is a synchronous request and, if the request is for ISH or SHR state, the request is a share no-count request.

Step 1226 waits for the response from LE1 30. If the response is an ACK, then the request is granted at step 1230 and a message is sent to the requesting task to resume processing. If the response from LE1 30 is a NAK, then the queued requests are transferred to the pending request list 216 of FIG. 2 and processing ends for an unlock request for the lock entity A when A is held in a share state.

Figure 13:
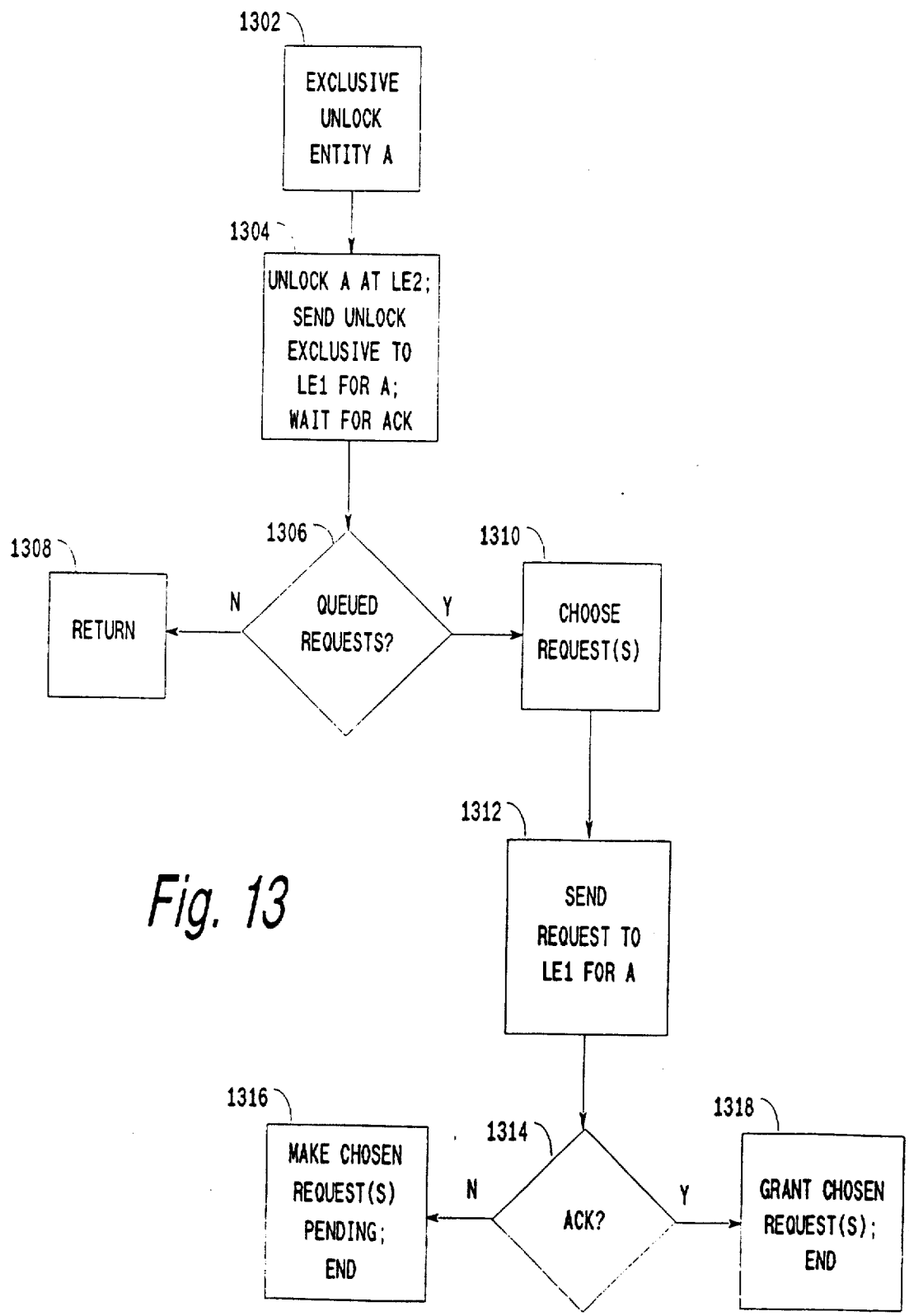

FIG. 13 is a flow-chart diagram of the steps performed by LE2 35 in processing an unlock request for an entity A which is held in an exclusive state (i.e. IEX or EXC). After the request is received at step 1302, LE2 35 sends a synchronous exclusive unlock request for the entity A to LE1 30. As set forth above in reference to FIG. 7, this request always returns an ACK response. When the ACK response is received, LE2 35 determines if there are any queued requests in the queued request lists 214s or 214e of FIG. 2. If there are no queued requests, then the processing performed by LE2 35 ends at step 1308.

However, if there are queued requests, then, at step 1310, one request or several compatible requests are chosen from the queued request lists 214s or 214e. At step 1312, a synchronous request for the lock entity A is sent to LE1 30. If the request is a share request (i.e. ISH or SHR), then a share no-count request is sent to LE1 30. Otherwise an exclusive request is sent. The message returned by the LE1 30 is analyzed at step 1314. If this is an ACK response then the request is granted, the entries in the lock table 212 of FIG. 2 are updated and the requesting process is notified so that it may resume execution.

If, however, the response at step 1314 is a NAK, then the queued requests may be incompatible with the current state of the lock in LE1. In this instance, the chosen queued requests are added to the pending request list 216 of FIG. 2 and the processing for the unlock exclusive request is complete.

The processing of all unlock request for the second embodiment of the invention may be the same as that described in reference to FIG. 13 for the first embodiment except that, at step 1312, all requests to LE1 30 are treated as EXC requests.

While the present invention has been described in the context of a closely coupled computer network, it is contemplated that it may be implemented in a tightly coupled processor environment, or by allowing all of the requests to be asynchronous, in a loosely coupled processor environment. Moreover, it is contemplated that the level one and level two lock managers may be implemented in hardware using dedicated processors or as a part of the systems software that controls each of the individual processing elements.

In particular, it is contemplated that LE1 may be implemented in software on each of the subsystems 10a through 10p and that the global lock table 206 may be implemented in shared memory accessible to all of the subsystems 10a through 10p. For this alternative embodiment, the shared memory would include a test-and-set instruction (also known as a readlock instruction) which implements a latch. When a task makes a request for an entity, LE1 obtains a latch assigned to the hash class to Which the entity belongs and then performs precisely the functions described above for LE1. In this embodiment, multiple processors may simultaneously access the LE1 information for respectively different hash classes. Since the processing time for each LE1 lock request is relatively small, latch contention at the hash class level is expected to be at a relatively low level.

While the invention has been described in terms of exemplary embodiments, it may be practiced as outlined above within the spirit and scope of the appended claims.

The invention claimed is:

1. In a computer system including means for executing a plurality of tasks in parallel and a shared resource which may be accessed by any of the plurality of tasks, wherein access to the shared resource is controlled by requests from the plurality of tasks for a mode of access from a set of predetermined modes of access, a method for managing the requests, said method comprising the steps of:
   a) receiving, at a first level access manager directly accessible by all of said plurality of tasks, a request from one of said plurality of tasks for access to the shared resource in a given mode, wherein said given mode is one of said predetermined modes;
   b) checking the received request for compatibility with a currently allowed mode of access to the shared resource;
   c) sending a message to the one task granting or denying the request if the request is found to be respectively compatible or incompatible in step b); and
   d) sending a further request from the one task to a second level access manager to which the shared resource has been assigned and which is directly accessible only by selected ones of said plurality of tasks, for access in the given mode if the request is found to be incompatible at step b).

2. The method set forth in claim 1 wherein: a lock entity is used to indicate the currently allowed mode of access to the shared resource; the requests for modes of access generated by said plurality of tasks refer to said lock entity; and said set of predetermined modes of access includes first, and second access modes, a request for said first mode being compatible with other requests for said first mode and a request for said second mode being incompatible with any other requests, said method further comprising the steps of:
- e) receiving and recording said incompatible requests at said second level access manager; and
- f) queueing, at said second level access manager, received requests for modes of access which are incompatible with the currently allowed mode of access.

3. The method set forth in claim 2 wherein each of said first and second modes includes first and second sub-modes, wherein, at the second level access manager, the first sub-mode of said second mode is compatible with the second sub-mode of said first mode, and said step e) further includes the steps of:
- retaining pending received requests which were not allowed by said first level access manager until an allowed request from said first level access manager is received;
- evaluating the sub-modes of access requested by said pending requests with the sub-mode of said allowed request to determine compatibility of the pending and allowed request; and
- allowing any pending requests which are found to be compatible with the allowed request.

4. The method set forth in claim 1 wherein the request from said one task to said first level access manager is a synchronous request and the request from said one task to said second level lock manager is an asynchronous request.

5. The method set forth in claim 1, wherein the step d) further includes the step of conditioning the one task to send a further request to a second level access manager for the given mode of access if the request is found to be compatible at step b).

6. In a computer system which includes means for executing a plurality of tasks concurrently and a set of data values which may be accessed by any of the plurality of tasks, a control system for controlling access to said set of data values, said control system comprising:
- first level access management means, coupled to receive, from each of said plurality of tasks, requests for permission to access said set of data values in one of a predetermined set of modes, wherein said first level access management means selectively allows ones of said received requests and indicates a permitted mode of access to the set of data values; and
- second level access management means, to which said set of data values is assigned and which is coupled to directly receive said requests only from selected ones of said plurality of tasks for recording the requests which were allowed by said first level access management means and for queuing ones of said requests which are not allowed by said first level access management means.

7. The access control system set forth in claim 6 wherein:
- the predetermined modes of access include first and second modes wherein the first level access management means allows multiple concurrent requests for said first mode of access but does not alloy any other requests concurrently with an allowed request for said second mode of access; and
- each of said first and second modes of access includes first and second sub-modes of access, wherein, said second level access management means includes means for concurrently allowing requests for the second sub-mode of said first mode of access and the first sub-mode of said second mode of access.

8. The access control system set forth in claim 6 wherein said second level access management means further includes:
- retaining means for retaining pending received requests which were not allowed by the first level access management means; and
- evaluating means, coupled to said retaining means, for evaluating said pending requests to determine if any of said pending requests may be allowed concurrently with a request which was allowed by said first level access management means.

9. The system set forth in claim 6 further including:
- first level requesting means, responsive to said plurality of tasks for synchronously requesting said first level access management means, for said modes of access; and
- second level requesting means, coupled to said first level requesting means and responsive to said first level access management means and to said plurality of tasks, for asynchronously requesting said second level access management means for said modes of access.

10. The system set forth in claim 6 wherein said means for executing a plurality of tasks includes multiple processing elements in a closely coupled configuration and said first level access management means includes a processing element distinct from said multiple processing elements and coupled to each of said multiple processing elements.

11. The system set forth in claim 10 wherein said second level access management means includes a computer program configured to be executed on at least one of said multiple processing elements.

* * * * *